United States Patent
Nixon

(10) Patent No.: US 9,821,767 B2
(45) Date of Patent: Nov. 21, 2017

(54) KEY MODULE

(71) Applicant: Robin Geoffrey Nixon, London (GB)

(72) Inventor: Robin Geoffrey Nixon, London (GB)

( * ) Notice: Subject to any disclaimer, the term of this patent is extended or adjusted under 35 U.S.C. 154(b) by 0 days.

(21) Appl. No.: 15/446,948

(22) Filed: Mar. 1, 2017

(65) Prior Publication Data

US 2017/0174178 A1  Jun. 22, 2017

Related U.S. Application Data

(63) Continuation of application No. PCT/GB2015/052496, filed on Aug. 28, 2015.

(30) Foreign Application Priority Data

Sep. 2, 2014  (GB) .................................. 1415482.7

(51) Int. Cl.
*G08B 1/08* (2006.01)
*B60R 25/102* (2013.01)
(Continued)

(52) U.S. Cl.
CPC ............ *B60R 25/102* (2013.01); *B60R 25/04* (2013.01); *B60R 25/30* (2013.01); *E05B 81/64* (2013.01);
(Continued)

(58) Field of Classification Search
CPC .... B60R 2025/0405; B60R 2025/0415; B60R 2325/205; B60R 25/04; B60R 25/102;
(Continued)

(56) References Cited

U.S. PATENT DOCUMENTS

| 8,810,392 | B1 | 8/2014 | Teller et al. |
| 2009/0203349 | A1* | 8/2009 | Hollstien ............. G08B 25/016 455/404.1 |

(Continued)

FOREIGN PATENT DOCUMENTS

| CN | 203070473 U | 7/2013 |
| CN | 203081064 U | 7/2013 |

(Continued)

OTHER PUBLICATIONS

International Search Report dated Jan. 5, 2016 for PCT Application No. PCT/GB2015/052496.

(Continued)

*Primary Examiner* — Ojiako Nwugo
(74) *Attorney, Agent, or Firm* — EIP US LLP

(57) ABSTRACT

Measures for use in operating a key module (100) associated with a vehicle. A proximity of the vehicle key module to a mobile telephony device (102) associated with an authorized user of the vehicle is monitored at the vehicle key module (100). In response to the monitoring indicating that a distance between the vehicle key module and the mobile telephony device (102) has exceeded a predetermined threshold distance, the vehicle key module transmits a lack of proximity alert message to the mobile telephony device. An operational status change code associated with one or more of the vehicle and the vehicle key module (100) is received by the vehicle key module (100) from the mobile telephony device (102). On the basis of the received operational status change code, an operational status change in relation to one or more of the vehicle and the vehicle key module is initiated.

17 Claims, 4 Drawing Sheets

(51) Int. Cl.
*E05B 81/64* (2014.01)
*B60R 25/04* (2013.01)
*B60R 25/30* (2013.01)
*G07C 9/00* (2006.01)
*H04M 1/725* (2006.01)

(52) U.S. Cl.
CPC ...... *G07C 9/00119* (2013.01); *G07C 9/00309* (2013.01); *H04M 1/72572* (2013.01); *B60R 2025/0405* (2013.01); *B60R 2025/0415* (2013.01); *B60R 2325/205* (2013.01); *G07C 2009/00539* (2013.01); *G07C 2009/00547* (2013.01)

(58) Field of Classification Search
CPC ............. B60R 25/30; E05B 81/64; G07C 2009/00539; G07C 2009/00547; G07C 9/00119; G07C 9/00309; H04M 1/72572
USPC ............. 340/539.11, 539.32; 455/466
See application file for complete search history.

(56) References Cited

U.S. PATENT DOCUMENTS

| | | | |
|---|---|---|---|
| 2010/0033342 A1 | 2/2010 | Patenaude | |
| 2011/0086632 A1* | 4/2011 | Tumey | H04M 1/66 455/421 |
| 2013/0297711 A1* | 11/2013 | Nhu | G06Q 50/01 709/206 |
| 2014/0074655 A1* | 3/2014 | Lim | G06Q 20/32 705/26.35 |
| 2014/0077929 A1* | 3/2014 | Dumas | G07C 9/00571 340/5.61 |
| 2014/0173439 A1 | 6/2014 | Gutierrez et al. | |
| 2014/0292481 A1* | 10/2014 | Dumas | G07C 9/00111 340/5.61 |
| 2014/0320263 A1* | 10/2014 | Fan | E05F 15/77 340/5.71 |
| 2015/0169968 A1* | 6/2015 | Michmerhuizen | G06K 9/00805 348/148 |
| 2015/0356330 A1* | 12/2015 | Toivanen | G06K 7/10376 340/10.1 |
| 2016/0343237 A1* | 11/2016 | Herman | G08B 25/008 |

FOREIGN PATENT DOCUMENTS

| | | |
|---|---|---|
| JP | 2012102529 A | 5/2012 |
| KR | 20130141849 A | 12/2013 |
| WO | 2012073978 A1 | 6/2012 |

OTHER PUBLICATIONS

UKIPO Search Report dated May 27, 2015 for GB Application No. GB1415482.7.

* cited by examiner

KEY MODULE

CROSS-REFERENCE TO RELATED APPLICATIONS

This application is a continuation of International Application No. PCT/GB2015/052496, filed Aug. 28, 2015, which claims priority to Great Britain Application No. GB 1415482.7, filed Sep. 2, 2014. The above-referenced patent applications are incorporated by reference in their entirety.

BACKGROUND OF THE INVENTION

Field of the Invention

The present invention relates to a key module. In particular, but not exclusively, the present invention relates to a key module associated with a vehicle.

Description of the Related Technology

The loss of any security access device, be it a house key, car key, fob or even a mobile device with access codes embedded on it is perhaps one of the most common and stressful everyday occurrences.

When somebody loses their keys, they lose all access to their personal sanctuaries at the same time. In an instant, an individual can be barred from their home, office, car, or worse, lose the keys that belong to the properties of others: this creates problems which can be enormously stressful and emotionally and financially punishing.

Crime statistics from 2014 show that houses are being targeted by burglars who steal high value car keys from inside the house and then return at a later date and steal the owner's vehicle.

Research conducted in 2013 found that 26% of UK car drivers had lost their keys at some point. Rolled out nationally (in the UK), these figures indicate that next year more than 7 million driver may lose or mislay their keys.

At present, there are no satisfactory ways of overcoming this problem; either purchase replacement keys and or change the locks. If the keys fall into the wrong hands, thieves can simply unlock the vehicle and drive away. Many modern vehicle keys have a remote opening function which gives a would-be thief the enormous advantage of having the vehicle identify itself. Given so many people lose their keys every day, it would be useful to have another level of security to protect what is, for many people, one of the most expensive items they own.

SUMMARY

According to a first aspect of the present invention, there is provided a method of operating a key module associated with a vehicle, the method comprising, at the vehicle key module: monitoring the proximity of the vehicle key module to a mobile telephony device associated with an authorized user of the vehicle; in response to the monitoring indicating that the distance between the vehicle key module and the mobile telephony device has exceeded a predetermined threshold distance, transmitting a lack of proximity alert message to the mobile telephony device; receiving, from the mobile telephony device, an operational status change code associated with one or more of the vehicle and the vehicle key module; and on the basis of the received operational status change code, initiating an operational status change in relation to one or more of the vehicle and the vehicle key module.

According to a second aspect of the present invention, there is provided a vehicle key module associated with a vehicle, the vehicle key module being configured to: monitor the proximity of the vehicle key module to a mobile telephony device associated with an authorized user of the vehicle; in response to the monitoring indicating that the distance between the vehicle key module and the mobile telephony device has exceeded a predetermined threshold distance, transmit a lack of proximity alert message to the mobile telephony device; receive, from the mobile telephony device, an operational status change code associated with one or more of the vehicle and the vehicle key module; and on the basis of the received operational status change code, initiate an operational status change in relation to one or more of the vehicle and the vehicle key module.

According to a third aspect of the present invention, there is provided a computer program comprising a set of computer-readable instructions which, when executed by a computerized device, cause the computerized device to perform a method of operating a key module associated with a vehicle, the method comprising, at the vehicle key module: monitoring the proximity of the vehicle key module to a mobile telephony device associated with an authorized user of the vehicle; in response to the monitoring indicating that the distance between the vehicle key module and the mobile telephony device has exceeded a predetermined threshold distance, transmitting a lack of proximity alert message to the mobile telephony device; receiving, from the mobile telephony device, an operational status change code associated with one or more of the vehicle and the vehicle key module; and on the basis of the received operational status change code, initiating an operational status change in relation to one or more of the vehicle and the vehicle key module.

According to a fourth aspect of the present invention, there is provided a mobile telephony device configured to perform a method according to the first aspect of the present invention.

According to a fifth aspect of the present invention, there is provided a computer program comprising a set of computer-readable instructions which, when executed by a mobile telephony device, cause the mobile telephony device to perform a method according to the first aspect of the present invention.

According to a sixth aspect of the present invention, there is provided a system comprising a key module and a mobile telephone device configured to perform a method according to the first aspect of the present invention.

According to a seventh aspect of the present invention, there is provided apparatus substantially in accordance with any of the examples as described herein with reference to and illustrated by the accompanying drawings.

According to an eighth aspect of the present invention, there is provided methods substantially in accordance with any of the examples as described herein with reference to and illustrated by the accompanying drawings. Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
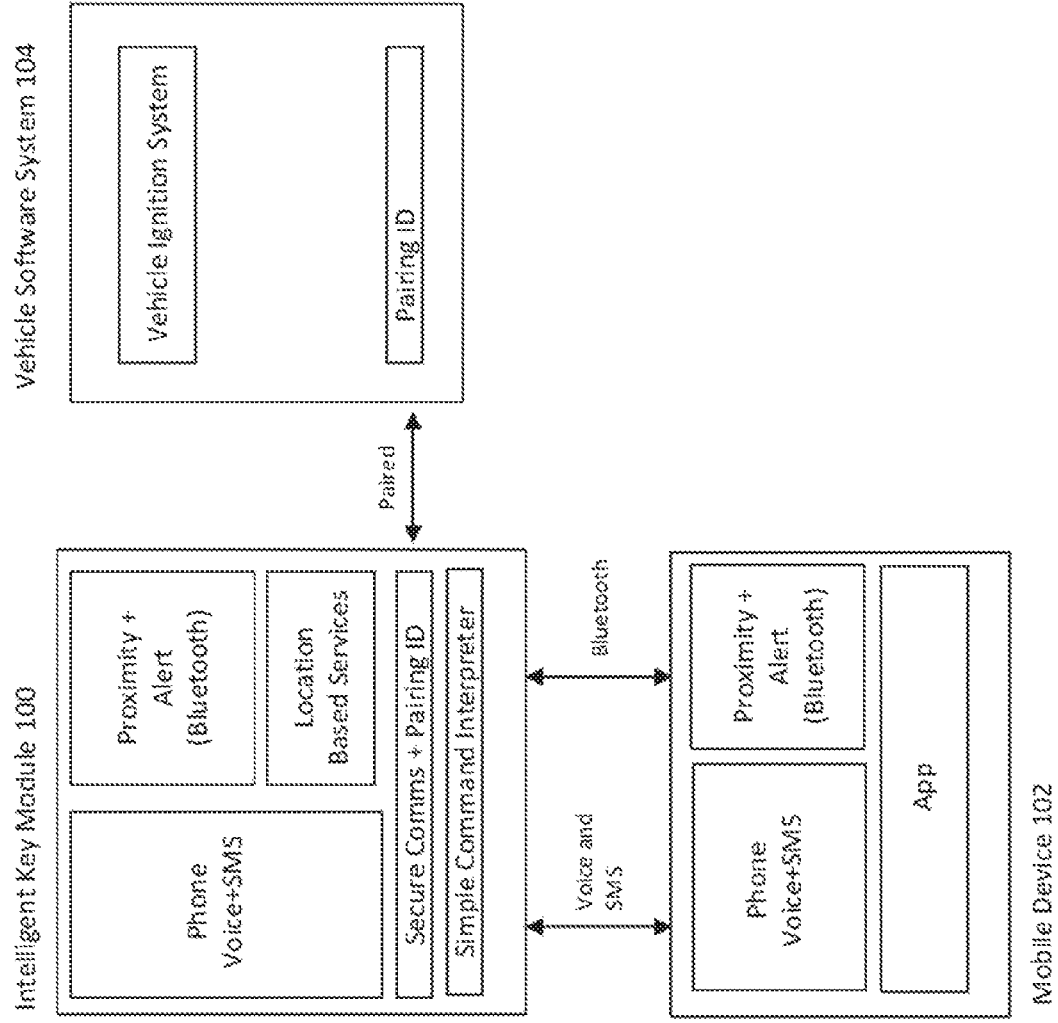
FIG. 1 shows a system diagram according to embodiments.

FIG. 1 shows a system diagram according to embodiments. FIG. 1 comprises a key module 100, a mobile telephony device 102 and a vehicle software system 104 of a vehicle.

In embodiments, key module 100 comprises a telephony component and Bluetooth proximity tag paired with the vehicle owner's (or otherwise authorized user of the vehicle) phone/mobile device 102.

In embodiments, if key module 100 goes out of range (or a predetermined threshold distance) of the owner's mobile telephony device 102 for a given amount of time, an alert will be generated and sent to the mobile telephony device 102 notifying the owner. This function may for example be implemented with use of the Bluetooth Link Loss Service enabled on key module 100 and mobile telephony device 102.

In embodiments, key module 100 is paired with the vehicle at factory fit time or if applicable after-market using a standalone component.

In embodiments, the telephony component of key module 100 comprises telephony and Simple Message Service (SMS) functionality allowing the owner to attempt to contact the key module and thus anyone who picks up the call. A command interpreter processor is also part of the system, for example using programmable application processor architecture. In embodiments, the interpreter receives coded command(s) via SMS and triggers the location based services to begin tracking and returning geographical location data (for example latitude and longitude data) as one or more messages (for example over SMS) to the owner's mobile telephony device 102. With regard to vehicle software system 104, here for context and reference purposes, modern vehicles have a number of control units and software subsystems. However, such functionality is not yet presented as a standard application programming interface (API) accessible by third parties (not to be confused with dashboard information UI which may be used as UI/UX (Stands for User Experience) to smartphone apps using components such as Apple's CarPlay). In embodiments, beyond id pairing, no direct communication between the vehicle control units and key module 100 is carried out.

With regard to mobile telephony device 102, in embodiments this comprises a device such as a smartphone that supports Bluetooth (e.g. Bluetooth 4.0) and can host third party application software (or 'apps'). Such application software is configured to communicate with key module 100 including for example sending commands and map and trace functionality.

Figure 2:
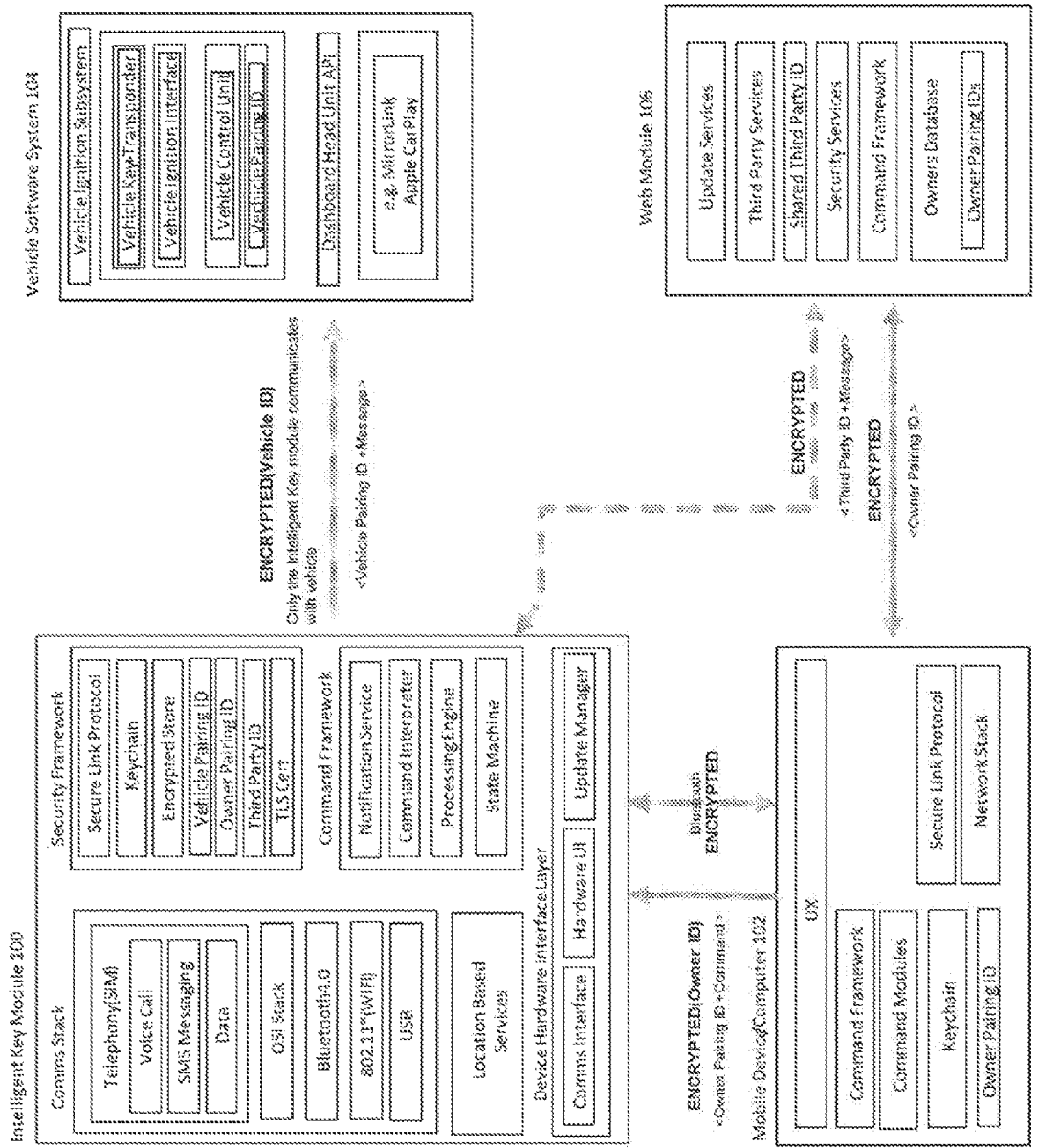
FIG. 2 shows a system diagram according to embodiments.

FIG. 2 shows a system diagram according to embodiments. FIG. 2 comprises a key module 100, a mobile telephony device 102, a vehicle software system 104 and a web module (or 'cloud/software as a service') 106.

In embodiments, key module 100 executes on the application processor using a standard communication stack thus keeping all processing local to a single hardware component. A number of standards, practices and programming requirements (C++/ARM) are referred to; however, the exact implementation of embodiments should not be limited to those described in detail and embodiments may be implemented on a number of different operating systems and architectures.

Key module 100 comprises software running on a consumer hardware module, the system requirements are for a programmable CPU (application processor) with installed security and network components. The application processor may be programmable in C/C++/Java and based on a performance ARM architecture, for example a Google Android port. The applicable performance criteria are measured by responsiveness of hardware module interface (e.g. depressing keys) and connectivity monitoring (e.g. detect signal drop).

The communications stack of key module 100 allows the owner to make a phone call to key module 100 and thus allows the owner to talk to anyone who may have found the key module. In embodiments, further functionality requires commands to be sent to key module 100, proximity loss detection, and location/position services for example involving standard security level and secure communications.

In embodiments, the telephony component of key module 100 comprises a standard subscriber identity module (SIM) hardware stack supporting voice calls and SMS messaging. In embodiments, the telephony component comprises a data component which may for example support Internet Protocol (IP) traffic. In embodiments, the SMS content is encrypted and unique (i.e. one time use) such that the application process will need to access the SMS message store (and event trigger) to decrypt and execute command(s) contained therein. The Open Systems Interconnection (OSI) is included here as an indicator; in embodiments, communication components may follow the standard model and may be bought off-the-shelf. The implementation of the stack deals with network communications and supports Transport Layer Security (TLS). In embodiments, the SMS messaging stack is a different subsystem.

In embodiments, Bluetooth is used to maintain an active connection for proximity checking, a number of profiles and characteristics (for example Link Loss Service) and alert level control. In embodiments, key module 100 comprises a Wi-Fi 802.11 component which is employed as part of the location based services using a service such as Skyhook to aid positioning in particular when GPS is insufficient due to broken line of sight (LOS). Wi-Fi may also be used as a communication conduit both for access to any further online services, a peer-to-peer channel with the vehicle or owner's computer/mobile device and potential Voice over IP (VoIP) functionality.

In embodiments, a USB connection is employed as a standard charging mechanism and high speed bulk data transfer for system updating.

In embodiments, security is a priority to the system which may interface directly with the vehicle management and control unit(s) (supporting advanced immobilization functions). In embodiments, a Public Key Infrastructure may be employed. In embodiments, a Secure Link Protocol, specific to key module 100, contains a number of fail-safes and checks to reduce attacks on systems. In embodiments, key module 100 comprises a KeyChain component with a key and certificate management system. In embodiments, key module 100 comprises an encrypted store for storing system, vehicle and owner data and may for example be encrypted using Public Key Infrastructure (PKI). The store may be wiped remotely as per product requirements specification, say for example by deleting the private key thus no longer allowing decryption of the content.

In embodiments, the Pairing IDs are implemented by one of a number of methods including using universally unique identifiers (UUIDS) or certificates/keys, the primary function of which is to only allow communications between paired devices (e.g. key module 100 and the vehicle). In embodiments, these IDs are fixed at factory fit where the vehicle is built and the key module is bound to the vehicle.

To enable secure network communications, TLS may be employed.

In embodiments, key module 100 comprises a command framework which is the hub of the specific application code written for the system. In embodiments, the command framework comprises an architecture which contains an event-driven messaging notification service that receives and dispatches commands to the system. In embodiments, a command interpreter parses and expands incoming commands passing them to the processing engine for execution. In embodiments, key module comprises a state machine for managing command transitions, queuing and ordering of commands.

In embodiments, key module 100 comprises a device hardware interface layer. In embodiments, this is included in the reference architecture to indicate a decoupling between the core software components. Aside from being good practice, it can be a requirement that different manufacturers will have different industrial designs and interface operations (buttons/touch screens). The communications interface may also Change based on required features and component availability. The hardware user interface (UI) may for example comprise a number of buttons including for example 'call owner'; however, these could be a number of different combinations and including touch-screens. An update manager may comprise a secure subsystem allowing a partial or complete system update.

With regard to vehicle software system 104, there is currently no standard vehicle Application Programming Interface (API) for controlling any of the vehicle's subsystems including the engine control unit, transmission control units, immobilizer and the associated array of sensors and control etc., so communication with these systems require specific software installed (for example at factory fit time) according to embodiments. In embodiments, a pairing key is implemented. In embodiments, vehicle software system 104 comprises a key transponder, immobilizer and charging system. In embodiments, an encrypted identification code unique to that key and vehicle is transmitted to allow the engine to start.

In embodiments, vehicle software system 104 comprises a dashboard head unit API. There are now a number of emerging technologies and proprietary standards being adopted in this domain, for example Apple's CarPlay, MirrorLink and Google's Open Automotive Alliance. The primary use for these systems is to use the vehicle display and interface functionality to access smartphone apps such as navigation and audio. In embodiments, the vehicle's display and control switches/knobs could be employed to directly control application software running on key module 100 and/or mobile telephony device 102 and may for example have a modified and safety conformant UX.

With regard to mobile device and/or computer 102, the owner communicates with key module 102 using application software (or 'app'), and if required handling the voice call thus hiding the key module phone number, or allowing communication via a third party call handling system.

In embodiments, the app is native, secure and incorporates tracking, tracing, and configuration management, access to a central services via web services or suitable API In embodiments, the app will provide the owner with an interface to support making calls, messaging and finding keys along with any additional commands defined in the product requirements specification. In embodiments, the command framework receives requests from the UX component (User experience) and translates these to command communications to key module 100 using the Secure Link Protocol (for example #over TLS).

In embodiments, the architecture exploits modern design pattern practices including Model View Controller, Chain of Command and Delegates to maintain an updatable application and secure code. In embodiments, the command communications include version stamping, pairing id and auditing information which may be recorded by for example an insurance company. In embodiments, a suitably decoupled and secure architecture will provide flexibility of (product) requirements to allow communication directly with key module 100 or via a central agency. Embodiments comprise a built-in and hardware based security framework for managing certificates, keys and polices. In embodiments, communications with key module 100 and any web services follow standard Authentication, Authorization and Accounting protocols.

In embodiments, the phone app may communicate with the vehicle subsystems and control units there maybe requirements, for example to allow communication of state information to/from the dashboard instrument cluster.

Typically the owner would use their mobile phone or tablet to communicate with key module 100; however, embodiments comprise a desktop version of the app, for example for use in case the mobile device is not available for some reason.

With regard to web module 106, this allows one or more features and technical functions to be implemented via a web module (or 'central server'). Embodiments comprise an API encapsulation of one or more features along with security and management functionality. For example, an owner/user is able to contact their key module 100 from any networked device using a website or web-app which is served by this architecture. In embodiments, a unique set of login credentials may be issued in order to allow identification of the owner as legitimate. In embodiments, third party agencies such as insurance companies or the emergency services would be able to access the owner's key module 100 say in a call center scenario where a user calls in having had their keys stolen and the insurance policy require the agency to find and track the vehicle. Embodiments enable more proactive control via the police tracking and shutting down the vehicle remotely. In embodiments, operational requirements for updating software and maintaining command symmetry between all parties can be best served by a centrally managed web module system.

In embodiments, the service software is implemented in a native programming language such as Java, C# and would be subject to security penetration testing.

In embodiments, key module 100 comprises a vehicle ignition module configured with one or more the following integrated functions/capabilities:
1. Vehicle Stop/Start, Open/Lock.
2. Mobile telecommunications network interface, for example incorporating Universal Mobile Telecommunications Services, phone, Bluetooth, SMS Text, and GPS Data capabilities.
3. Ability to "pair with" other mobile devices so the key module can be controlled by those devices. 4. Ability to "pair with" other mobile devices so that the key module has (possibly limited) control and access to the functions of that device.
4. Ability to act as an interface between the vehicle and the owner via the owner's mobile device.
5. Ability to send, receive and issue data instructions between itself and mobile telephony device 102 and to pass data on to the vehicle when located into the vehicles electronics systems or within the vehicle electronics sphere of influence.
6. Ability to enable paired mobile phone functions to be displayed and accessed via the vehicle's on-board electronic systems.
7. Ability to make and receive voice calls, SMS texts, GSM, GPS and Bluetooth and Data from all platforms as a stand-alone device.

Embodiments comprise measures, including one or more of a method, a key module, apparatus, a computer program, a mobile telephony device and a system for use in operating a key module associated with a vehicle. At the vehicle key module, the proximity of the vehicle key module to a mobile telephony device associated with an authorized user of the vehicle is monitored. In response to the monitoring indicating that the distance between the vehicle key module and the mobile telephony device has exceeded a predetermined threshold distance, a lack of proximity alert message is transmitted to the mobile telephony device. An operational status change code associated with one or more of the vehicle and the vehicle key module is received from the mobile telephony device. On the basis of the received operational status change code, an operational status change in relation to one or more of the vehicle and the vehicle key module is initiated.

The predetermined threshold distance may be set according to a comfort zone for the owner, for example 30 m. In embodiments, the predetermined threshold distance is user configurable via one or more of the key module and the mobile telephony device.

In embodiments, the initiating comprises disabling an ignition function of the vehicle key module whereby the vehicle key module cannot be used to start the ignition of the vehicle. In embodiments, the initiating comprises disabling a vehicle entry function of the vehicle key module whereby the vehicle key module cannot be used to unlock one or more doors of the vehicle.

In embodiments, the initiating comprises activating a geographical location function on the vehicle key module to report a geographical location of the vehicle key module to the mobile telephony device.

In embodiments, the initiating comprises activating an audible signal generation function on the vehicle key module.

In embodiments, the initiating comprises activating a visible signal generation function on the vehicle key module.

Embodiments comprise receiving user input responsive to the activated visible signal generation function, and initiating a telephone call from the vehicle key module to the mobile telephony device.

In embodiments, the initiating comprises activating a geographical location function on the vehicle key module to report a geographical location of the vehicle key module to the mobile telephony device.

In embodiments, the initiating comprises activating a vehicle vicinity function on the vehicle key module to monitor whether the vehicle key module is within a given predetermined threshold distance from the vehicle. In some such embodiments, in response to the activated vehicle vicinity function indicating that the vehicle key module is within the given predetermined threshold distance from the vehicle, transmitting a vehicle vicinity alert message to the mobile telephony device.

In embodiments, the initiating comprises activating a microphone of the vehicle key module and transmitting audio signals detected by the activated microphone to the mobile telephony device.

In embodiments, the initiating comprises transmitting, to a communication interface of the vehicle, a command to change an operational status of the vehicle.

In embodiments, the operational status change command commands disabling of an ignition system of the vehicle.

In embodiments, the operational status change command commands disabling of an ignition system of the vehicle when the vehicle is next stationary.

In embodiments, the operational status change command commands locking of one or more doors of the vehicle.

Embodiments comprise a vehicle key module associated with a vehicle, the vehicle key module being configured to monitor the proximity of the vehicle key module to a mobile telephony device associated with an authorized user of the vehicle, in response to the monitoring indicating that the distance between the vehicle key module and the mobile telephony device has exceeded a predetermined threshold distance, transmit a lack of proximity alert message to the mobile telephony device, receive, from the mobile telephony device, an operational status change code associated with one or more of the vehicle and the vehicle key module, and on the basis of the received operational status change code, initiate an operational status change in relation to one or more of the vehicle and the vehicle key module.

Embodiments comprise a computer program comprising a set of computer-readable instructions which, when executed by a computerized device, cause the computerized device to perform a method of operating a key module associated with a vehicle, the method comprising, at the vehicle key module, monitoring the proximity of the vehicle key module to a mobile telephony device associated with an authorized user of the vehicle, in response to the monitoring indicating that the distance between the vehicle key module and the mobile telephony device has exceeded a predetermined threshold distance, transmitting a lack of proximity alert message to the mobile telephony device, receiving, from the mobile telephony device, an operational status change code associated with one or more of the vehicle and the vehicle key module, and on the basis of the received operational status change code, initiating an operational status change in relation to one or more of the vehicle and the vehicle key module.

Embodiments comprise a mobile telephony device configured to perform embodiments described herein.

Embodiments comprise a computer program comprising a set of computer-readable instructions which, when executed by a mobile telephony device, cause the mobile telephony device to perform embodiments described herein.

Embodiments comprise a system comprising a key module and a mobile telephone device configured to perform embodiments described herein.

Embodiments comprise apparatus substantially in accordance with any of the examples as described herein with reference to and illustrated by the accompanying drawings. Embodiments comprise methods substantially in accordance with any of the examples as described herein with reference to and illustrated by the accompanying drawings.

Embodiments involve a key module 100 associated with a vehicle. In embodiments, key module 100 comprises a smart ignition key created as a part of the vehicle which enables indirect communication between the vehicle and a mobile telephony device 102 associated/owned by the vehicle owner (or other authorized user of the vehicle). In embodiments, key module 100 acts as an electronic data-bridge that allows mobile data traffic between the vehicle and the owner's mobile phone device.

In embodiments, key module 100 does not directly affect the vehicle's security system, although it can be remotely caused to changes states which in turn causes the vehicle's on-board electronics to change behavior.

In embodiments, key module 100 has smart phone functionality incorporated into its design at the point of manufacture, for example including Universal Mobile Telecommunications Service (UMTS) and/or any other appropriate telephony/telecommunications functionality.

In embodiments, key module 100 keeps, records and retains data relating to its parent vehicle's mileage, service history etc. In embodiments, in the event of unusual circumstances such as an accident, key module 100 will log all information as to time, place, conditions etc. In embodiments, in the event of air bag deployment, key module 100 will call the emergency services with all the relevant information. Closely allied to this function, in embodiments key module 100 comprises a built-in "Panic Button" facility.

In embodiments, key module 100 draws power from and charges itself via the vehicle's power supply. When not in use, key module 100 may be charged via a dedicated induction pad or similar device. In embodiments, when key module 100 reaches a minimum power reserve, a low power signal is emitted. In embodiments, if key module 100 powers off in its passive state, then key module 100 will still allow access to the vehicle in the normal way. In embodiments, if key module 100 has powered off (e.g. in search mode) it may need to be charged before allowing access to the vehicle. In embodiments, key module 100 is uniquely electronically bonded to (or 'paired with') the vehicle at a given point in the vehicle's manufacture.

In embodiments, key module 100 is powered by its own built-in battery. This battery may be charged in a number of ways, for example by induction when located within a specific region in relation to the vehicle's ignition circuit. As another example, key module 100 may be charged by being placed on its own induction pad or via a USB connection.

In embodiments, system upgrades and hard data information exchange between key module 100 and other computing devices is available via a built in USB port.

In embodiments, key module 100 comprises an actual physical key embedded within its body. In embodiments, this actual "old fashioned" physical key is incorporated into the body of key module 100 in such a way that, in the event of the power supply either dropping below a minimum support level or failing altogether, the key mechanism will be released. However, in embodiments, the physical key will only be released if the power supply runs down or out without any of the other higher functions being engaged. For example, if "ping" range function has been activated because the key module 100 and mobile telephone device 102 are outside their comfort zone (predetermined threshold distance), the physical key will not be released. In embodiments, if key module 100 is opened/destroyed in an effort to get at the physical key stem, the actual act of breaking the key module 100 body will break or damage the physical key in such a way as to render it useless. In embodiments, the physical key will only allow access to the base level functions of the vehicle or locking mechanism, such as open/close/stop/start.

Figure 3:
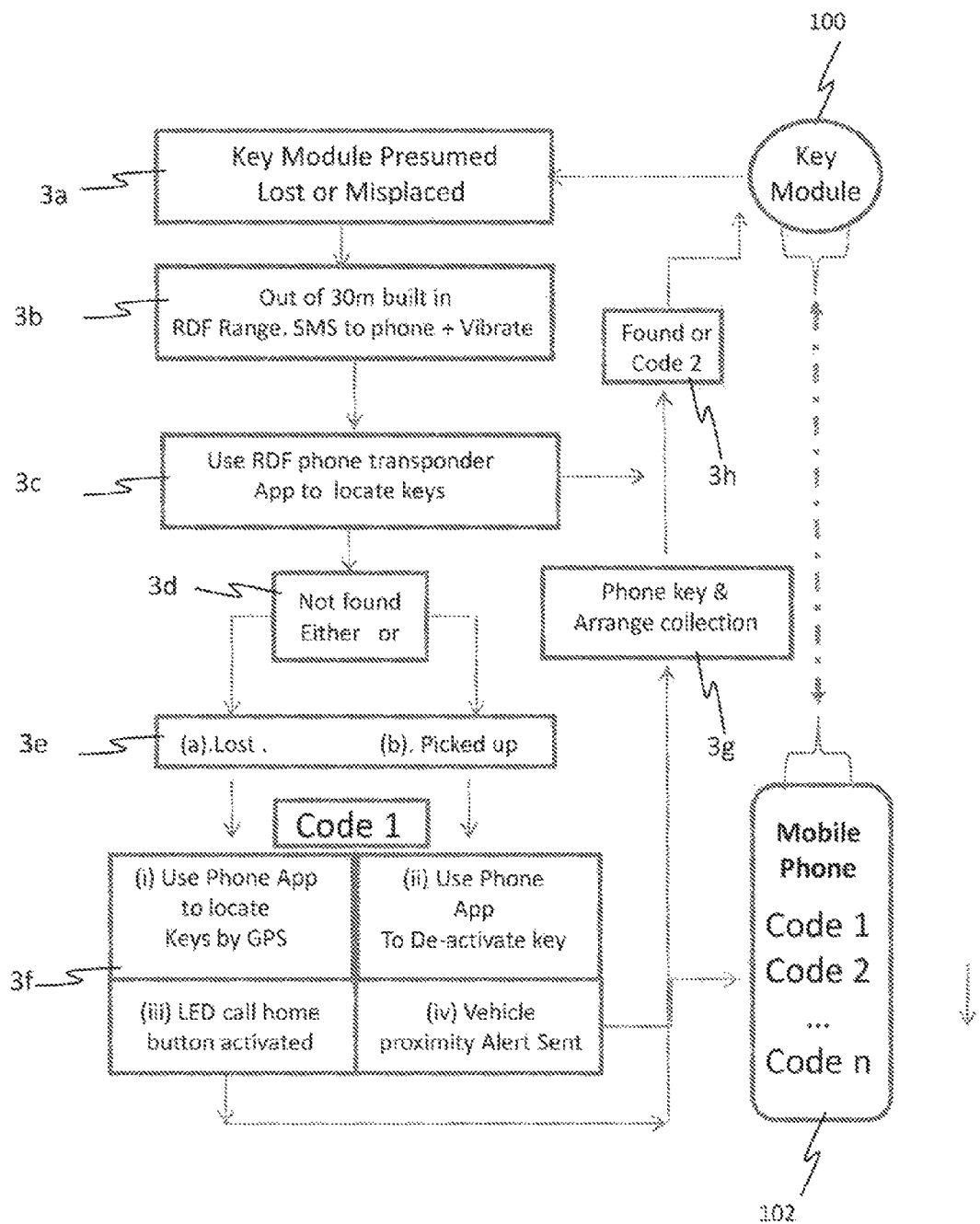
FIG. 3 shows a flow diagram according to embodiments.

FIG. 3 shows a flow diagram according to 'passive state' or 'search mode' embodiments. In its passive state, only the functions and parameters of key module 100 are changed, accessed or engaged by the mobile telephony device 102 of the vehicle owner's (or other authorized user of the vehicle). A number of functions on mobile telephony device 102 can also be changed, accessed or engaged by key module 100 once the two devices have been paired or bonded together. For example Audio, RDF, GPS, SMS and other signal output and data functions may be operated in either direction between the two devices, so key module 100 can be used to locate mobile telephony device 102 and if required lock that device out until it is found.

In step 3a, once key module 100 is paired with mobile telephone device 102, the key module 100 will typically be in hibernation with most or all systems dormant except for a "ping" or location function. The "ping" function tells the two devices that they are within the owner's pre-set comfort zone or acceptable range (or 'predetermined threshold distance'). Once key module 100 passes outside of the owners pre-set safe zone, key module 100 is presumed lost or misplaced.

In step 3b, key module 100 detects that mobile telephony device 102 is "outside" the nominal range or "comfort zone" and sends mobile telephony device 102 a text message (and possibly also a vibrate message alert).

In step 3c, if key module 100 is not easily located, the owner can access key module 100 via mobile telephony device 102 to activate either a radio detection frequency (RDF) transponder of key module 100 and/or an audible signal function of key module 100. If key module 100 cannot be traced by the audio signal, the RDF feature can be engaged via mobile telephony device 102 and will be able to zero in on key module 100 if it has (for example) been lost behind furniture, dropped out of a pocket, left in a shop, etc.

In step 3d, key module 100 cannot be located and is out of audible and RDF range (or possible is out of the operating parameters of these functions).

In step 3e, if key module 100 remains undetected, it is reasonable to assume that it is either comprehensively lost or has been picked up. At this stage, the owner may choose to either proceed to step 3g and make a telephone call to key module 100 to see if the call is answered. Alternatively, if there is an element of doubt as to how key module 100 has been lost, the owner may enter in user input 'Code on mobile telephony device 102. Upon receipt of the 'Code user input, mobile telephone device 102 transmits a corresponding operational status change code to key module 100 in step 3f. In step 3f, mobile telephony device sends an SMS text (or other suitable message) to key module 100 which carries a function activation code. Once received this code implements one or more of the following:

(i) A GPS signal function of key module 100 is switched to its On state. This will enable the owner to track and find key module 100 by tracing the signal using mobile telephony device 102.

(ii) A key vehicle entry function of key module 100 is disabled. This will ("if pressed by the finder) call mobile telephony device 102 and establish verbal contact between the owner and the finder.

(iii) A visible signal generation function on key module 100 is activated, for example a flashing light emitting diode (LED) call button or suchlike. This will "if pressed by the finder call mobile telephony device 102 and establish verbal contact between the owner and the finder.

(iv) A vehicle vicinity function on key module 100 is activated. This will send an SMS "Alert" text to the owner with the information that key module 100 is with or within the immediate vicinity of the vehicle, that further attempts to locate the keys should be stopped and that the (Active) Code 2 functions of key module 100 have been engaged.

Once the vehicle has been rendered secure by "blinding" (in other words the mobile device causes the module to not recognize the vehicle), the owner may then either continue to trace the unit by a combination of the above functions.

In step 3g, having made the vehicle safe, the owner may choose to call key module 100 directly in the knowledge that whatever the outcome the vehicle has been rendered secure.

In step 3h, either key module 100 has been detected and returned to its rightful owner or (Code 2, Active State) functions are engaged.

Figure 4:
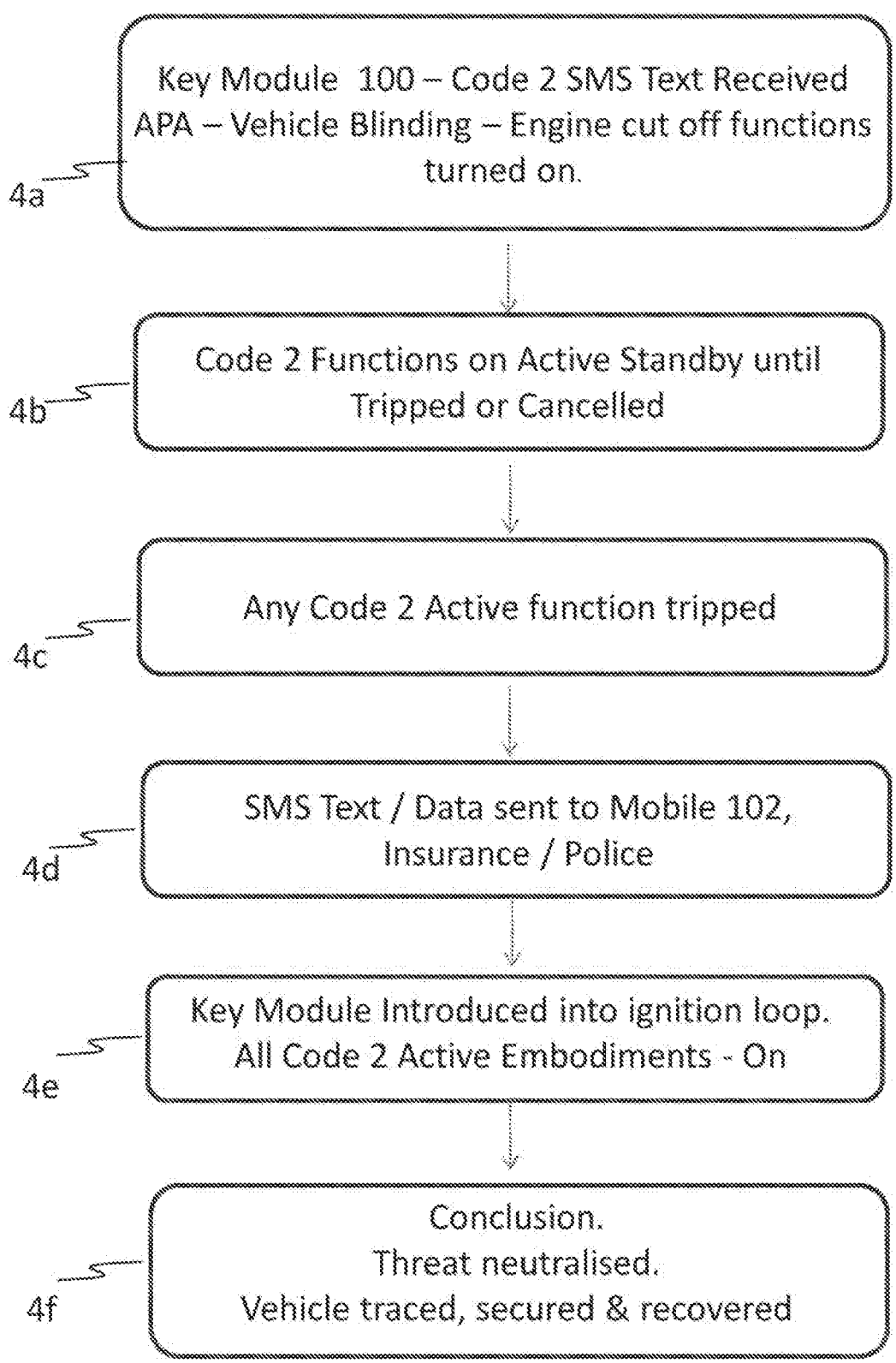
FIG. 4 shows a flow diagram according to embodiments.

FIG. 4 shows a flow diagram according to 'active state' embodiments where communication with vehicle software system 104 may be conducted. Key module 100 can be put into its active state in a number of ways as described below. It is important to note that in embodiments, key module 100 does not interact with or change any parameters of the on-board electronic system of the vehicle (for example when key module 100 is remotely blinded by mobile telephony device 102 so it no longer recognizes the vehicle). In embodiments, with key module 100 in its blinded state, the vehicle alarm systems retain their integrity and will remain in that state. In essence, the lock remains the same but the key changes its state. The term "tripped" used herein means that the one or more of the key module 100 "active state" functions have been caused to respond, (for example, the alarm has been activated or tripped). It should be understood that the FIG. 4 "active state" flow diagram represents an example logical sequence of events and other embodiments may employ other sequences. In reality, any of these steps may be immediately activated depending on the circumstances that key module 100 senses once a Code 2 instruction is received. For example, in embodiments, if the vehicle has been stolen and is being driven at the time the Code 2 instruction is received, key module 100 will automatically transition to step 4f.

Step 4a. The Code 2-SMS Text message is received by key module 100. One or more of these following "active state" functions are now switched on:
(i) Auto proximity alert.
(ii) Vehicle blinding.
(iii) Engine cut out when vehicle is stationary.

Step 4b. Step 4a functions are active, but none have been activated, for example the proximity alarm has not been tripped. The 4a functions will remain on standby until any security functions are tripped or a FIG. 3h (code 2) cancel text has been sent by mobile telephony device 102.

Step 4c. One or more of the key module 100 step 4b functions have been activated (or 'tripped'). For example, key module 100 was within the vehicle vicinity function's pre-set range at the time the Code 2 SMS Text was received. The Key Module 100 is assumed stolen.

Step 4d. The key module 100 automatically sends SMS Text/Data information to mobile telephony device 102, such as insurance and police services noting the time, date and other relevant information about the event. Step 4e. The key module 100 has been introduced into the vehicle's ignition loop. The vehicle itself can now be assumed stolen. In this condition, in some embodiments, all functions as described in the "active embodiments" are activated.

Step 4f. Conclusion—here, either the key module 100 functions were activated in time to neutralize any threat of theft, or the vehicle was taken without consent, tracked and disabled when stopped. In accordance with embodiments, either the vehicle has been rendered secure by the early activation of the key module 100 built-in passive security functions, or the vehicle can be tracked and secured by the active security functions.

Embodiments of the present invention enable a radical shift of the whole concept and existing mind-set of security access devices (for example keys). Embodiments promote an actual conscious shift from the status quo that exists at present, where the tendency can be to "put all eggs in one basket", or more specifically referring to embodiments described here "all keys on one chain" (any chain is only as strong as its weakest link) to a situation where any key or link can be lost or misplaced and then traced and found by utilizing the functions inherently built into the other keys or links. All things being bidirectional, if somebody loses their keys they can find them or at least render them void by using their mobile phone. Likewise, if somebody loses their phone, they can find it or void it by using their keys.

The above embodiments are to be understood as illustrative examples of the invention. Further embodiments of the invention are envisaged. For example, in alternative embodiments, further command codes in addition to Code 1 and Code 2 may be devised and configured on key module 100 and mobile telephony device 102.

The embodiments described above primarily relate to a vehicle security device. However, alternative embodiments apply to non-vehicle scenarios. The key module of embodiments can be used where a sophisticated electronic entry system may be advantageous or required. The key module of embodiments can be applied wherever a key system/device is present to ensure flexibility, personal security and safety for any domestic, office, vehicle or industrial door entry system.

Alternative embodiments do not specifically relate to access or entry systems or vehicles. For example, embodiments may be used in applications such as remotely controlled monitoring devices where one or more features of a module may be directly controlled and accessed by a mobile telephony device.

Embodiments comprises a method of operating a controllable module, the method comprising, at the controllable module: monitoring the proximity of the controllable module to a mobile telephony device associated with an authorized user of the controllable module; in response to the monitoring indicating that the distance between the controllable module and the mobile telephony device has exceeded a predetermined threshold distance, transmitting a lack of proximity alert message to the mobile telephony device; receiving, from the mobile telephony device, an operational status change code associated with the controllable module; and on the basis of the received operational status change code, initiating an operational status change in relation to the controllable module.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of operating a key module associated with a vehicle, the method comprising, at the vehicle key module:
monitoring a proximity of the vehicle key module to a cellular telephony device associated with an authorized user of the vehicle;

in response to the monitoring indicating that a distance between the vehicle key module and the cellular telephony device has exceeded a predetermined threshold distance, transmitting a lack of proximity alert message to the cellular telephony device;

receiving, from the cellular telephony device, an operational status change code associated with one or more of the vehicle and the vehicle key module; and on the basis of the received operational status change code, initiating an operational status change in relation to one or more of the vehicle and the vehicle key module.

2. The method of claim 1, wherein the initiating comprises disabling an ignition function of the vehicle key module whereby the vehicle key module cannot be used to start the ignition of the vehicle.

3. The method of claim 1, wherein the initiating comprises disabling a vehicle entry function of the vehicle key module whereby the vehicle key module cannot be used to unlock one or more doors of the vehicle.

4. The method of claim 1, wherein the initiating comprises activating a geographical location function on the vehicle key module to report a geographical location of the vehicle key module to the cellular telephony device.

5. The method of claim 1, wherein the initiating comprises activating an audible signal generation function on the vehicle key module.

6. The method of claim 1, wherein the initiating comprises activating a visible signal generation function on the vehicle key module.

7. The method of claim 6, comprising:
receiving user input responsive to the activated visible signal generation function; and
initiating a telephone call from the vehicle key module to the cellular telephony device.

8. The method of claim 1, wherein the initiating comprises activating a geographical location function on the vehicle key module to report a geographical location of the vehicle key module to the cellular telephony device.

9. The method of claim 1, wherein the initiating comprises activating a vehicle vicinity function on the vehicle key module to monitor whether the vehicle key module is within a given predetermined threshold distance from the vehicle.

10. The method of claim 9, comprising, in response to the activated vehicle vicinity function indicating that the vehicle key module is within the given predetermined threshold distance from the vehicle, transmitting a vehicle vicinity alert message to the cellular telephony device.

11. The method of claim 1, wherein the initiating comprises activating a microphone of the vehicle key module and transmitting audio signals detected by the activated microphone to the cellular telephony device.

12. The method of claim 1, wherein the initiating comprises transmitting, to a communication interface of the vehicle, a command to change an operational status of the vehicle.

13. The method of claim 12, wherein the operational status change command commands disabling of an ignition system of the vehicle.

14. The method of claim 13, wherein the operational status change command commands disabling of an ignition system of the vehicle when the vehicle is next stationary.

15. The method of claim 12, wherein the operational status change command commands locking of one or more doors of the vehicle.

16. A vehicle key module associated with a vehicle, the vehicle key module comprising:
at least one processor; and
at least one memory including computer program code, the at least one memory and the computer program code being configured to, with the at least one processor, cause the vehicle key module to:
monitor a proximity of the vehicle key module to a cellular telephony device associated with an authorized user of the vehicle;
in response to the monitoring indicating that a distance between the vehicle key module and the cellular telephony device has exceeded a predetermined threshold distance, transmit a lack of proximity alert message to the cellular telephony device;
receive, from the cellular telephony device, an operational status change code associated with one or more of the vehicle and the vehicle key module; and
on the basis of the received operational status change code, initiate an operational status change in relation to one or more of the vehicle and the vehicle key module.

17. A non-transitory computer-readable storage medium program comprising computer-executable instructions which, when executed by a processor, cause a computing device to perform a method of operating a key module associated with a vehicle, the method comprising, at the vehicle key module:
monitoring a proximity of the vehicle key module to a cellular telephony device associated with an authorized user of the vehicle;
in response to the monitoring indicating that a distance between the vehicle key module and the cellular telephony device has exceeded a predetermined threshold distance, transmitting a lack of proximity alert message to the cellular telephony device;
receiving, from the cellular telephony device, an operational status change code associated with one or more of the vehicle and the vehicle key module; and
on the basis of the received operational status change code, initiating an operational status change in relation to one or more of the vehicle and the vehicle key module.

* * * * *